United States Patent [19]

Jensen et al.

[11] Patent Number: 4,919,951
[45] Date of Patent: Apr. 24, 1990

[54] METHOD FOR THE HEAT CURING OF RAW MEAT PRODUCTS

[75] Inventors: Hans C. S. Jensen, Vejle; Henning Pedersen, Borkop, both of Denmark

[73] Assignee: Tulip Slagterierne A.M.B.A., Vejle, Denmark

[21] Appl. No.: 203,087

[22] PCT Filed: Oct. 2, 1987

[86] PCT No.: PCT/DK87/00119
§ 371 Date: Jun. 2, 1988
§ 102(e) Date: Jun. 2, 1988

[87] PCT Pub. No.: WO88/02222
PCT Pub. Date: Apr. 7, 1988

[30] Foreign Application Priority Data

Oct. 2, 1986 [DK] Denmark ............................. 4718/86

[51] Int. Cl.$^5$ .............................................. A23L 3/22
[52] U.S. Cl. ...................................... 426/241; 99/451; 219/10.81; 426/513; 426/414
[58] Field of Search ............... 426/237, 241, 243, 513, 426/516, 399, 414; 99/451; 219/388, 10.81

[56] References Cited

U.S. PATENT DOCUMENTS

| 2,685,833 | 8/1954 | Hagopian | 99/451 |
| 2,938,804 | 5/1960 | Gordon et al. | 99/451 |
| 3,753,651 | 8/1973 | Boucher | 422/22 |
| 4,237,145 | 2/1980 | Risman et al. | 426/241 |
| 4,348,357 | 9/1982 | Bithell | 422/22 |
| 4,366,177 | 12/1982 | Wells et al. | 426/243 |
| 4,560,567 | 12/1985 | Rausing | 426/516 |

Primary Examiner—George Yeung
Attorney, Agent, or Firm—Kenyon & Kenyon

[57] ABSTRACT

A method for heat curing a raw meat medium is disclosed wherein the meat medium is conveyed through a pipe while being subjected to electromagnetic waves having a frequency of less than 300 MHz. A continuous heating of the meat medium is hereby effected so that the heating thereof is finished when it leaves the pipe and immediately thereafter while its temperature is still at least 70° C., can be cut into slices or pieces and packed.

10 Claims, 1 Drawing Sheet

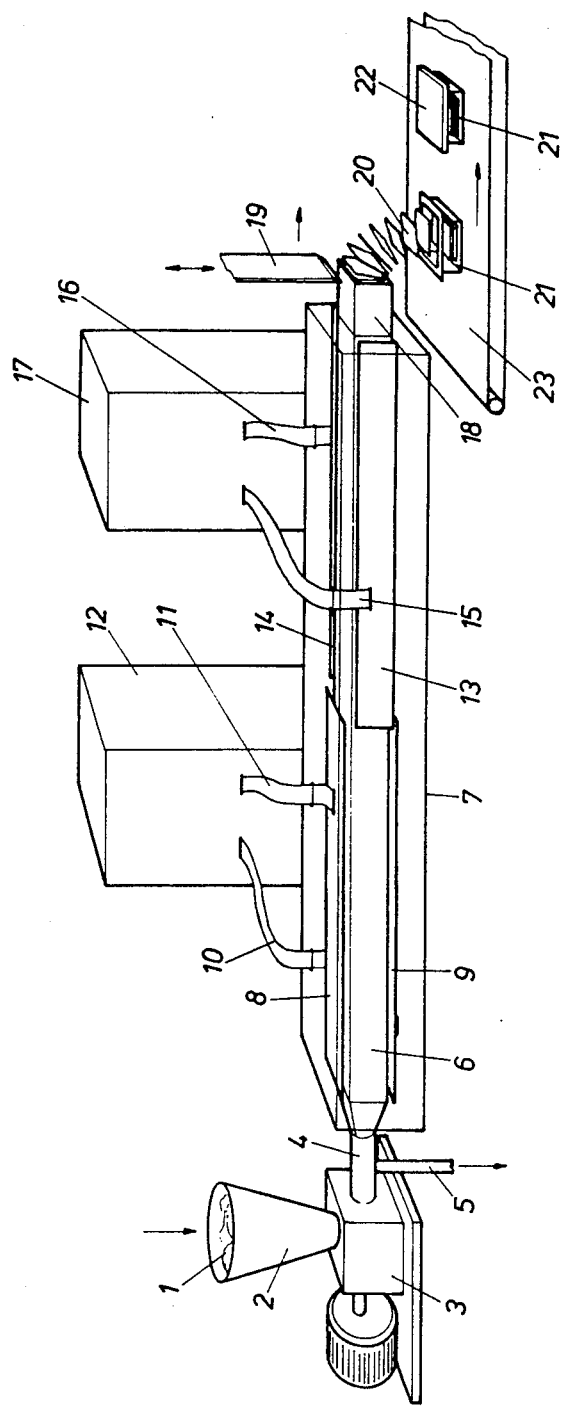

METHOD FOR THE HEAT CURING OF RAW MEAT PRODUCTS

The invention relates to a method for the heat curing of raw meat products, such as meat, meat offal, fish and the like, and an oven for carrying out the method.

Heating or boiling of protein-containing meat products, such as forcemeat products for the production of meat products, luncheon meat and the like, usually takes place by enclosing certain amounts of meat medium in a hermetically sealed metal container which is then heated by means of steam or hot water.

This is, however, a very difficult as well as a very slow process. Thus the meat medium must be prepacked prior to being heated which requires machining of the metal container in order that it is hermetically sealed after the meat product has been added.

Another method of heating is heating of meat medium poured into a particularly tight-fitting boiling film which after the heating can be opened in order that the finished product can be taken out and cooled and perhaps cut up in slices prior to the final packing.

Moreover, the heating is time-consuming. The temperature of the raw meat product is maximum 4° C. at the beginning of the boiling, and it must be heated to at least approximately 70° C. and approximately 95° C. at the most in order to have been heated sufficiently, which will typically take about 4-6 hours. This slow heating time means that the production must be carefully adjusted which makes the operation rigid and inexpedient.

Add to this that the finished product is not always of the desired quality because the long heating time means that fat and stock are boiled out and accumulates along the surface where it congeals after cooling. The finished article is hereby given an undesirable appearance and the taste is impaired due to the heterogenous mixture of components of the finished product.

Moreover, the size and shape of the finished product are limited by the packing, and the shape and size of the product can therefore only be changed at considerable costs. Thus, a large stock and a varied number of moulds are required in order to satisfy the demand for the various finished products.

A method is known from Norwegian printed specification No. 154,155, which may overcome some of these disadvantages. This known method comprises the conveyancing of a finely divided meat or fish medium under pressure through a heat curing chamber where the medium is heated to approximately 140° C. for a few minutes, and sterilized. The medium is then pumped through a forming pipe in which it is subjected to heating and subsequent cooling, respectively, before it is pressed into a mould. The mould is provided with a valve at the outlet end and a cutting and stop plate, respectively, which ensure that the medium is adequately compressed in order that it can maintain its shape before it is finally discharged into a packing.

This method is, however, inconvenient and therefore uneconomic in that it partly causes certain disadvantages by the curing, and partly presupposes the use of expensive and complex equipment. Thus, the method requires that the medium must be heated to 140° C. which means that steam formations occur in the medium which must therefore be subjected to a considerable pump pressure in order to expel the steam. This partly requires a great pump power and partly that there is a backstop in the pipe, in this case by way of a valve.

Add to this that at least two and preferably three temperature zones are required in the pipe, of which the zone closest to the outlet is a cooling zone. Finally, the described embodiment of the heating part by means of a high-frequency electromagnetic field is not particularly expedient since the heat supply takes place in a one-sided manner and under the use of a high power.

It is the object of the invention to overcome these disadvantages and shortcomings of the known methods for the production of meat products, and this is achieved by a method where the medium is passed through a pipe and in this passes one or more electromagnetic fields with a frequency of between 10 and 41 MHz so that the medium is heated.

A considerable simplification and flexibility of the production is hereby obtained, first and foremost because a continuous production can take place in that the meat medium can be pumped and therefore can be conveyed by means of a pump. The velocity of the meat medium is in correspondence with the medium being heated by the electromagnetic field in order that it reaches the required temperature in its entire cross section during the passage. This takes a few minutes as opposed to the hitherto known long boiling and heating times. The penetration depth of the applied electromagnetic waves is by the comparatively high frequency so large that meat media with a thickness of up to about 15 cm can be heat cured within this time interval.

Moreover, the method makes it possible to change the cross section and size of the finished product in that this can take place by the use of conveyancing pipes with suitable cross sectional shape. This reduces the demand for different boiling containers just as it contributes to a considerable increase in production in that the cumbersome packing prior to the boiling can be dispensed with.

To this must be added that the quality of the finished product is much better since the short heating time does not make the fat or stock boil out whereas it stays inside the product making the product homogenous. This makes the product more attractive, and the taste is improved by the uniform distribution of the ingredients.

By cutting and storing the heated product immediately on leaving the oven, it is possible to store aseptically in for instance transparent containers which gives considerable advantages productionwise but also for the consumer who is now able to see the product.

By using one or several pairs of electrodes it becomes possible to obtain a reliable and thorough heating of the article in its entire cross section by the applying of comparatively low power.

By subjecting the article to waves of different frequencies and/or intensities, a considerably larger variety of meat products with different ingredients and shape can be heat cured.

If the electrodes substantially correspond to the shape of the pipe, the power can be utilized in the best possible way.

Finally, it is expedient to displace the electrode pairs in relation to each other and thereby obtain a more even heat distribution and a smaller power requirement.

In the following the invention will be described in closer detail with reference to the drawing which shows an example of an embodiment of a plant for carrying out the method.

As shown in the drawing the production equipment comprises a funnel or silo 2 into which the raw meat medium 1 is poured.

In connection herewith there is arranged a pump 3 which in a generally known manner can pump the raw product 1 into a connecting pipe 4. To this connecting pipe 4 is shown a connected piece 5 into which air from the raw product can be sucked, if so required, prior to the product being heat cured in order that air pockets do not occur in the finished product.

A pipe 6 is connected to the connecting pipe 4 which can carry the raw product through the heating section. The pipe 6 is manufactured of a material which allows electromagnetic waves to pass and has a small dielectric loss.

The pipe can for instance be made of plastic and have a dimension, such as a wall thickness of 1 cm, an inner square cross section with a side length of 8 cm, and a suitable length.

In the shown example, two pairs of plate electrodes 8, 9 and 13, 14 are arranged around this pipe 6, said pairs being displaced 90° to each other. The electrodes can be made of an aluminium plate and be of a length corresponding to that of the pipe 6.

If two pairs of electrodes are not required, this can be changed either by using only one pair or by increasing the number by further pairs.

The individual electrodes are electrically connected by cables 10, 11, 15, 16 to a generator 12, 17. Each generator is a frequency generator of a generally known type which may have an output power of approximately 20 KW. The frequency can be between 10 and 41 MHz, for instance 13.56 MHz, which tests have shown provides a suitable penetration depth.

The electrodes and the pipe is moreover enclosed in a steel plate cabinet 7 which partly protects the equipment and partly forms a screen for radiation.

By a meat medium whose starting temperature at the entrance of the pipe 6 is maximum 40° C. and which must be heated through to approximately 80°–90° C., about 300 kj/kg meat medium must be added, said heating with a generator power of about 20 KW will take approximately 15 seconds per kilo meat medium.

The conveyancing speed through the pipe 6 must be adjusted accordingly, whereby a continuous heat curing of the meat medium can be carried out.

Once the heating has taken place the meat medium has congealed and become solid in that it leaves the pipe as a rod of finished product 18 which is then cut and packed.

Cutting can take place by means of a generally known flying knife which is used for cutting up the finished product into slices 20 or pieces.

The slices or pieces 20 are then placed in trays 21 on a suitable conveyor belt 23, and a lid 22 is put on which is sealed while the temperature of the slices 20 is still about 70° C.

When products of a different composition are to be produced, this mixture can be added to the plant which is then rearranged in accordance with the product in that fat and water content etc. have a different dielectric loss. Moreover, products having a different cross sectional shape can be produced in that the pipe 6 can be replaced by a pipe having a different cross section. In this manner it is possible quickly and easily to switch production to a different article and shape.

Furthermore, it will be easy to cut the finished article to any length in order that any desired length can be produced; something which has so far not been possible.

The finished product will moreover be of an even better quality than has so far been produced, partly because fat and stock is distributed over the entire cross section of the product which improves the taste, and partly in that the article can be observed directly because the surface is free from any coatings.

Productionwise it is moreover an advantage that the package is no longer a limitation in that the production can be adapted to another package merely by adjusting the cutting and the shape of the product accordingly.

We claim:

1. A method for heat curing a raw meat medium, the method comprising:
   conveying the meat medium through a pipe, and
   passing at least one electromagnetic field through the pipe into the meat medium, the electromagnetic field having a frequency of less than 300 MHz, whereby meat medium is heat cured.

2. The method of claim 1, wherein the method further comprises:
   cutting the heated medium.

3. The method of claim 1, wherein the method further comprises:
   packaging the cut medium while the medium is still in the heated condition.

4. A method for producing a packaged heat cured meat product, the method comprising:
   (a) forcing a raw meat medium through an elongated passageway at a preselected velocity;
   (b) providing at least one high frequency electromagnetic field of less than 300 MHz in at least one zone of the passageway, the intensity and frequency of the field being such that at the preselected velocity the meat medium is heated uniformly by the electromagnetic field to a curing temperature in the range of approximately 80°–90° C. before leaving the zone; and
   (c) processing the cured meat medium into sterile packages.

5. The method of claim 4, wherein step (b) comprises providing a plurality of high frequency electromagnetic fields in an equal plurality of successive zones along the axis of the passageway.

6. The method of claim 4 or 5, wherein the frequency of the field in each zone is between 10 and 41 MHz.

7. The method of claim 4 or 5 wherein the frequency of the field in at least one zone is 13.56 MHz.

8. The method of claim 4, wherein the velocity of the meat medium through the passageway is selected such that the time to travel the length of the passageway is not more than a few minutes, so that fat and stock remain distributed over the entire cross section of the meat medium in the passageway, the cured meat product is homogeneous.

9. The method of claim 4 or 5 or 8, wherein step (c) comprises cutting the cured meat medium as it emerges from the elongated passageway, placing the cut meat medium into packages, and sealing the packages before the temperature of the meat medium falls from the curing temperature to below about 70° C.

10. The method of claim 9 wherein the cutting step comprises cutting the cured meat medium into slices.

* * * * *